(12) United States Patent
Korinth (10) Patent No.: US 6,655,171 B2
(45) Date of Patent: Dec. 2, 2003

(54) ABSORPTION COOLING DEVICE

(75) Inventor: Christoph Korinth, Mudersbach (DE)

(73) Assignee: Dometic GmbH, Siegen (DE)

( * ) Notice: Subject to any disclaimer, the term of this patent is extended or adjusted under 35 U.S.C. 154(b) by 0 days.

(21) Appl. No.: 10/148,996

(22) PCT Filed: Dec. 7, 2000

(86) PCT No.: PCT/EP00/12360

§ 371 (c)(1),
(2), (4) Date: Aug. 5, 2002

(87) PCT Pub. No.: WO01/42723

PCT Pub. Date: Jun. 14, 2001

(65) Prior Publication Data

US 2003/0056533 A1 Mar. 27, 2003

(30) Foreign Application Priority Data

Dec. 7, 1999 (DE) .......................... 199 58 955

(51) Int. Cl.[7] .......................... F25B 15/00; F25B 15/10; F25B 15/12; F25B 37/00
(52) U.S. Cl. .......................... 62/476; 62/483; 62/484; 62/487; 62/488; 62/491; 62/492; 62/494
(58) Field of Search .......................... 62/476, 101, 483, 62/484, 487, 488, 491, 492, 494, 110

(56) References Cited

U.S. PATENT DOCUMENTS

| | | | |
|---|---|---|---|
| 2,240,540 A | | 5/1941 | Beach |
| 3,715,896 A | | 2/1973 | Eber |
| 4,458,504 A | * | 7/1984 | Wallgren et al. ............... 62/490 |
| 4,637,218 A | * | 1/1987 | Tchernev ..................... 62/106 |
| 4,724,679 A | * | 2/1988 | Radermacher ................ 62/101 |
| 5,537,837 A | * | 7/1996 | Hsieh ........................ 62/238.3 |
| 5,865,039 A | * | 2/1999 | Muller et al. ................ 62/490 |
| 5,921,105 A | * | 7/1999 | Andersson et al. ........... 62/494 |
| 6,581,406 B2 | * | 6/2003 | Pai et al. ...................... 62/484 |

FOREIGN PATENT DOCUMENTS

| | | |
|---|---|---|
| DE | 625 571 C | 2/1936 |
| DE | 195 16 630 A | 11/1996 |
| EP | 0 134 176 A | 3/1985 |
| FR | 772 935 A | 11/1934 |
| GB | 486 815 A | 6/1938 |

* cited by examiner

Primary Examiner—William C. Doerrler
Assistant Examiner—Filip Zec
(74) Attorney, Agent, or Firm—Birch, Stewart, Kolasch & Birch, LLP (57) ABSTRACT

An absorption cooling device includes
  an expeller (7) for expelling a working agent from an enriched solvent,
  a first connecting line (11) for transferring said expelled working agent from said expeller (7) to a condenser (9),
  a second connecting line (15) for transferring said condensated working agent from said condenser (9) to an evaporator (13),
  a third connecting line (16) for transferring said evaporated working agent from said evaporator (13) to an absorber unit (17),
  a fourth connecting line (21) for transferring said solvent depleted of working agent from said expeller (7) to said absorber unit (17),
  a fifth connecting line (19) for transferring said solvent enriched with working agent from said absorber (17) to said expeller (7),
wherein in one end of said fifth connecting line a first liquid level (25) of said solvent is formed and on the other end a second liquid level (29) is formed, and
the total surface of said second liquid level (29) is smaller than ten times a medium cross-section of said fifth connecting line (19) or said fourth connecting line (21).

17 Claims, 6 Drawing Sheets

ABSORPTION COOLING DEVICE

This application is the national phase under 35 U.S.C. §371 of PCT International Application No. PCT/EP00/12360 which has an International filing date of Dec. 7, 2000, which designated the United States of America.

The invention pertains to an absorption cooling device for operating a thermodynamic cooling circulation such that the cooling circuit takes heat from a space to be cooled. Such a cooling device traditionally e.g. is used for cooling down a refrigerator section of a household refrigerator or the like as compared to an environment.

In a cooling device operated under the traditional so-called absorption method a working substance, in most cases ammonia soluble in a solvent, mostly water, is applied in the circuit. This circuit includes an expeller also referred to as cooker or pump, a condenser, an evaporator and an absorber. In the expeller the working agent out of solvent enriched with the working agent is expelled with supply of external energy by e.g. a radiator. In gaseous condition the working agent is transferred from the expeller to the condenser where the working agent conveys heat to the environment, cools down and finally condenses. The condensed working agent is transferred from the condenser to the evaporator where it evaporates with absorbing heat on a low level, e.g. in the evaporator of a refrigerator, and in gaseous condition is transferred to the absorber. In the absorber the working agent is absorbed in the solvent under emission of heat and then is returned to the expeller in a form dissolved in the solvent, the described working agent circuit being closed thereby.

Since the transport of the working agent from the absorber to the expeller is effected in a form dissolved in the solvent and the solvent which due to the effect of the expeller is enriched in working agent, again is transferred to the absorber for there being enriched with working agent a so-called solvent circuit exists between expeller and absorber.

In the solvent circuit solvent loaded with working agent in liquid form is fed to the expeller via a connecting line or similar, the connecting line being connected to a reservoir subsequent to the absorber. Using this reservoir the working agent can be filled into the working agent circuit. Due to gravity the solvent accumulates as liquid volume in the reservoir, wherein in correspondence to the amount of solvent volume a liquid level or a liquid surface, respectively, of said solvent volume is formed. Below said liquid level the solvent exists in liquid form together with the working agent dissolved therein, while above said liquid level a gas atmosphere is existent of gaseous solvent, working agent and, if applicable, an assistant gas for operation of the working agent circuit and further gases.

To the described liquid volume the solvent enriched with working agent is supplied from the absorber, the solvent enriched with working agent penetrating the liquid level as continuous trickle or drop-by-drop and thus merging into the liquid level existing on low level. The reservoir, therefore, does not only takes in a substantial portion of the working medium in order to keep it on store for the working agent circuit but also makes available absorber surface for a residual absorption for the circuit by the enlarged surface. Finally, it serves as level balance for the filling level in the expeller and establishes the connection of expeller, evaporator, absorber and, if applicable, condenser as well as siphon pipe.

In spite of the fact that the known apparatus per se works satisfactorily, it nevertheless turned out that the construction comprises drawbacks due to system and construction. Thus, a large portion of the working medium is stored in the reservoir without functional effect for step by step being supplied to the expeller. A substantial portion of the liquid in the reservoir does not participate in the proper absorption but only serves for a residual absorption in insufficient degree. By the functional separation of the working medium into an active and inactive portion a substantial demand for a larger total volume of coolant is given, this resulting in an increased portion of ecologically noxious ammonia and chromate portions, which also cause problems in terms of waste disposal. Finally, the above-described apparatus requires an expensive constructional harmonization between the reservoir and the expeller in order to make available a suitable liquid level. For receiving a large liquid volume and for making available a large absorption and cooling surface the reservoir must be of large volume and, therefore, beside its terminals for the different components of the unit like absorber, evaporator, expeller and condenser, siphon pipe and filling valve comprises numerous welding seam connections so that the danger of leakages is increased.

The invention, therefore, is based on the object of improving an absorption cooling device of the known kind such that with equal cooling power reduced storing of coolant is required and, thus, simultaneously waste disposal expense is reduced. Said device in addition is to require lower constructional expense and be cheaper manufacturable with lower weight at the same time.

The invention herein starts on an absorption cooling device with an expeller for expelling a working agent in gaseous form of enriched solvent for depleting said working agent in a solvent circuit, a first connecting line for transferring the expelled working medium from said expeller to a condenser for condensing said expelled working agent, a second connecting line for transferring said condensed working agent from said condenser to an evaporator for evaporating said condensed working agent with absorption of heat from a surface to be cooled, a third connecting line for transferring said evaporated working agent from said evaporator to an absorber unit, a fourth connecting line for transferring said solvent depleted of working agent from said expeller to said absorber unit, wherein said absorber unit comprises a counterflow exchange path extending over a predefined level difference, into which ends said third connecting line on a low level and into which ends said fourth connecting line on a high level so that said working agent in said solvent enriches in said absorber unit, a fifth connecting line for transferring said solvent enriched with working agent from said absorber to said expeller.

Herein, at least a part of said fifth connecting line is filled with a liquid portion of said solvent and in an area of the end of said fifth connecting line, facing said expeller or in said expeller itself a first liquid level of said solvent is formed, a corresponding second liquid level communicating with said first liquid level through said fifth connecting line being formed.

A first aspect of the invention is based on the conception of dimensioning the total surface of said second liquid level comparatively small and of reducing the total volume of said working agent in that only an active portion of said working agent is used in the absorption process and not an inactive portion is used for storing. As will be explained later, thereby the constructional leveling of said liquid level to said expeller can be achieved in simple manner. The system only must be filled with the amount of working medium (ammonia, water, inhibitor) required for creating said absorption process. This results in the advantages that the amount of operating substances/noxious matter ammonia, water, corrosion inhibitor is reduced and thus also the problems created in connection with a later waste disposal (costs, danger potential) are reduced. By a smaller total volume costs and weight can be saved and by the direct introduction of the absorbing working medium into the heat exchanger the corresponding absorption heat is utilized better. Finally, operating safety (resistance to pressure) is increased in that in relation to traditional absorption cooling devices less welding connections are used.

In case of smaller embodiment of said total surface of said second liquid level an amount of solvent enriched with working agent, directly supplied from said absorber to at least a part of said total surface causes a comparatively large change of working agent concentration in said solvent directly below said second liquid level. Thereby, in particular during the starting phase of said cooling device, when changes in concentration of said working agent in said solvent occur regularly, said changes in concentration quickly are transferred to the solvent again supplied to said expeller so that to a great extent a direct change to the stationary operating condition is possible.

It turned out to be advantageous to refer said total surface of said second liquid level to a correspondingly determined medium cross-section of said fifth connecting line or said fourth connecting line. Herein, it is advantageous in particular to embody said total surface of said second liquid level smaller than ten times, in particular smaller than eight times, in particular smaller than five times, in particular smaller than three times and in particular smaller than twice said medium cross-section. In particular, said total surface of said second liquid level can also be embodied approximately equal to said cross-section.

Herein, it is possible that said total surface of said second liquid level is composed of several partial surfaces each correspondingly completely encircled, of said second liquid level, which are created within spatially separated components of said cooling device on mutually corresponding level.

In accordance with a second aspect the invention also is characterized in that said second liquid level is encircled by at least one or several of said components of a group of components which includes said fifth connecting line, namely in an area of an end thereof facing said absorber, said absorber and said third connecting line, namely in an area of an end facing the entry into said absorber. By this measurement the shape of said second liquid level also is determined by the shape of the components of this group.

Herein, the shape of these components themselves is designed with respect to the function intended for the respective component, for operation of said cooling device. This means that the cross-sections of said third and fifth connecting lines are designed such that said connecting lines optimally fulfill their function for transferring said evaporated working agent from said evaporator to said absorber unit and/or for transferring, respectively, said solvent enriched with working agent from said absorber to said expeller with respect to operating conditions and manufacturability of said cooling device. The same is true for said absorber which essentially is designed for making available a counterflow exchange path where said working agent in said solvent is enriched.

This results in that said second liquid level is formed in components of said cooling device, which are not dimensioned with respect to a large total surface of said liquid level, as was the case in traditional cooling systems in which said second liquid level is formed in a component in terms of function completely different from said components of said above-cited group of components, namely a reservoir for said solvent.

Preferably, no further components but only the components of said group take part in the encircling of said second liquid level.

In spite of the fact that with the cooling device a comparatively quick reaching of the stationary operating condition is possible, nevertheless, changes in height or level, respectively, of said first and/or second liquid level, respectively, are possible during the starting phase of said cooling device. In particular, the level of said first and/or second liquid level, respectively, can drop during the starting phase of said cooling device.

Preferably, the amount of solvent as well as the amount of working agent is dimensioned such that the entire surface of said second liquid level is encircled by said fifth connecting line at least during the stationary operation of said cooling device.

Alternatively, also preferably the surface of said second liquid level can be encircled by said absorber at least during the stationary operation of said cooling device.

Herein, said counterflow exchange path of said absorber preferably includes a pipe extending obliquely to horizon, in which the solvent supplied to said absorber on high level trickles down and therein enriches with working agent. Said pipe can then in advantageous manner serve for encircling of said second liquid level.

Alternatively, it is provided for in advantageous manner that said pipe of said counterflow exchange path in one piece extends in a pipe extension out of said counterflow exchange path such that said pipe extension encircles the surface of said second liquid level. Said pipe extension herein can be connected without seam and with formation of a welding or brazing point to the proper pipe of said counterflow exchange path.

Preferably, the amount of liquid in said cooling device is dimensioned such that during the starting phase of the operating of the device said second liquid level is encircled by said third connecting line. Herein, said liquid level can drop during operation of the device so that he then will assume the above-described level later and transfer of said evaporated working agent into said absorber unit can take place in uninhibited manner as well.

With respect to a simple manufacture said third connecting line for supplying said evaporated working agent from said evaporator to said absorber unit ends in the pipe extending obliquely to horizon, in a position where said pipe extends on both sides of said connecting point, in straight line essentially in particular. Thereby, the connection between said pipe and said third connecting line can simply be embodied in form of a T-member, the horizontal beam of said "T" being aligned with said pipe and said vertical beam of said "T" being aligned with the end of said third connecting line.

Herein, preferably also in respect to a simple manufacturability said fifth connecting line for transferring said solvent enriched with working agent from said absorber to said expeller is coupled to said absorber such that said fifth connecting line directly ends in said pipe of said counterflow exchange path or an extension thereof.

Furthermore, said absorption cooling device preferably is operated with an assistant gas supporting the transfer of said working agent in its gaseous form. In respect thereto, preferably a sixth connecting line for transferring said assistant gas from said absorber to said evaporator is provided for, said sixth connecting line ending in said evaporator on a high level.

Furthermore, with respect to a good energetical efficiency of said cooling device a liquid heat exchanger is provide for in which said fourth connecting line and said fifth connecting line extend in areas with formation of a counterflow heat contact one beside the other.

In order to achieve that the absorption surface of said absorption cooling device approximately corresponds to the absorption surface of a device with a reservoir, care is taken in accordance with a further preferred feature of the invention that said absorption surface of said reservoir in case of unchanging total absorption surface by increasing the absorption surface of said counterflow exchange path of said absorber unit is integrated into it. This can be effected in advantageous manner in that said absorption surface of said reservoir by extension of said counterflow exchange path of said absorber unit is integrated into it or that said absorption surface or that said absorption surface of said reservoir by enlargement of cross-section of said pipeline of said counterflow exchange path of said absorber unit is integrated into it or that said absorption surface of said reservoir by enlargement of the surface of said inside wall of said pipeline of said counterflow exchange path of said absorber unit is integrated in it by means of grooves arranged in said wall. Said grooves advantageously can extend in two different directions and cross correspondingly.

Further features, advantages and details of the invention result from the following description of preferred embodiments with reference to the drawing. In the drawing

A first embodiment of the invention is explained in the following with reference to FIGS. 1 to 4. In these FIGS. an absorption cooling device 1 is shown which includes a working agent circuit 3 and a solvent circuit 5. Herein, ammonia is used as working agent and water is used as solvent.

Said working agent circuit includes an expeller 7, a condenser 9, a connecting line 11 for connecting said expeller to said condenser 9, an evaporator 13, a connecting line 15 for connecting said condenser 9 to said evaporator 13, an absorber 17 and a connecting line 16 for connecting said absorber 17 to said expeller 7.

Said solvent circuit 5 includes said connecting line 19 used in common with said working agent circuit, between said absorber 17 and said expeller 7 as well as a connecting line 21 for returning said solvent from said expeller to said absorber 17.

Said connecting line 19 between said absorber 17 and said expeller 7 is built U-shaped so that solvent will accumulate in a lower area of said U-bend as liquid volume. Herein, said liquid solvent forms a first liquid level 25 in an area 23 protruding into said expeller 7 within said expeller 7. In an end section 27, not facing said expeller 7, of said connecting line 19 correspondingly a second liquid level 29 is formed, said two liquid levels 25 and 29 essentially being on a common level 31.

Said connecting line 19 within said expeller 7 continues in vertically aligned ascending pipe 33. Said expeller 7 further includes a heating sleeve 32 operated by gas or electrically and shown in the figures schematically, which heats said solvent in the area of said liquid level 25 such that vapor bubbles are formed which rise in said ascending pipe 33 upwardly. By the creation of said vapor bubbles said liquid level 25 can be broken up, however, herein a medium liquid level 25 can also be correlated to the mixture of vapor bubbles and solvent, which is defined by the weight of the liquid column and said vapor bubbles in said ascending pipe 33 as well as in said part 23 of said connecting line 19, subsequent to said ascending pipe 33.

Since in said ascending pipe 33 the vapor pressure of said working agent is higher than that of said solvent, in said connecting line 11 between said expeller 7 and said condenser 9 a gas atmosphere is created in which essentially said working agent is enriched, said solvent enriched with working agent due to gravity falling in downward direction in an annular pipe 35 encircling said ascending pipe 33. Thereby, said expeller 7 also forms a pump bringing said solvent poor in working agent to a higher level. Said annular pipe 35 encircles said connecting line 19 in the area of the U-bend so that there a counterflow heat exchanger 35 is formed, the solvent heated in said expeller 7 moving in said annular pipe 35 opposite to the flowing direction of said solvent flowing in said connecting line 19 to said expeller 7, wherein simultaneously said solvent enriched with working agent and flowing to said expeller 7 is preheated.

Said expelled gaseous working agent supplied to said condenser 9 through said connecting line 11 is condensed in said condenser 9 with emission of heat to cooling ribs 37 and is supplied to said evaporator 13 through said connecting line 15 in essentially liquid form. In said evaporator 13 said liquid working agent is evaporated with absorption of heat. The surface of said evaporator 13 herein in sensible manner is in thermoconductive connection with e.g. a refrigerating compartment not shown in the figures, of a refrigerator so that the absorption of heat by said working agent in said evaporator 13 results in cooling down of said refrigerating compartment.

Figure 1:
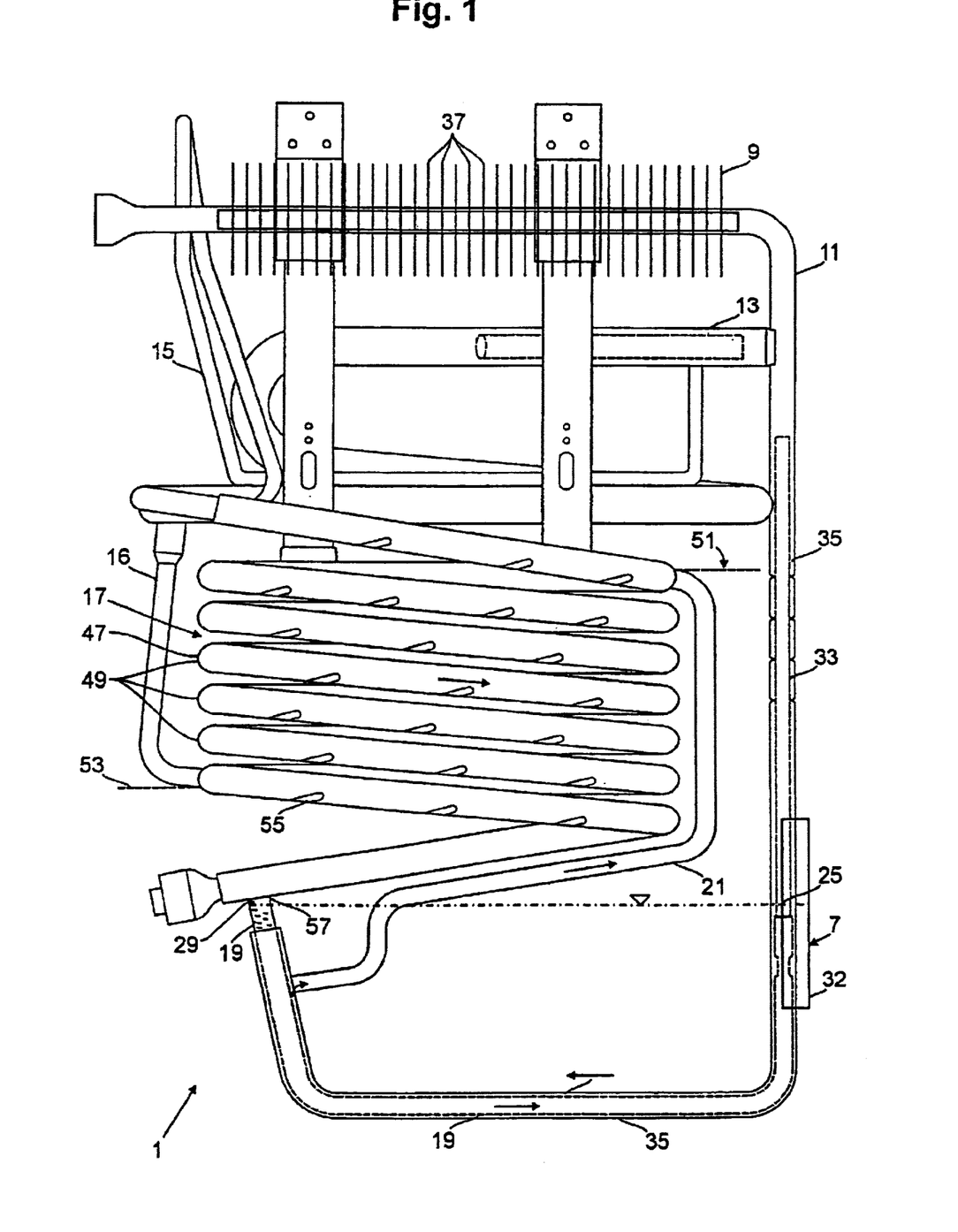
FIG. 1 shows an absorption cooling device in accordance with a first embodiment of the invention.
Figure 2:
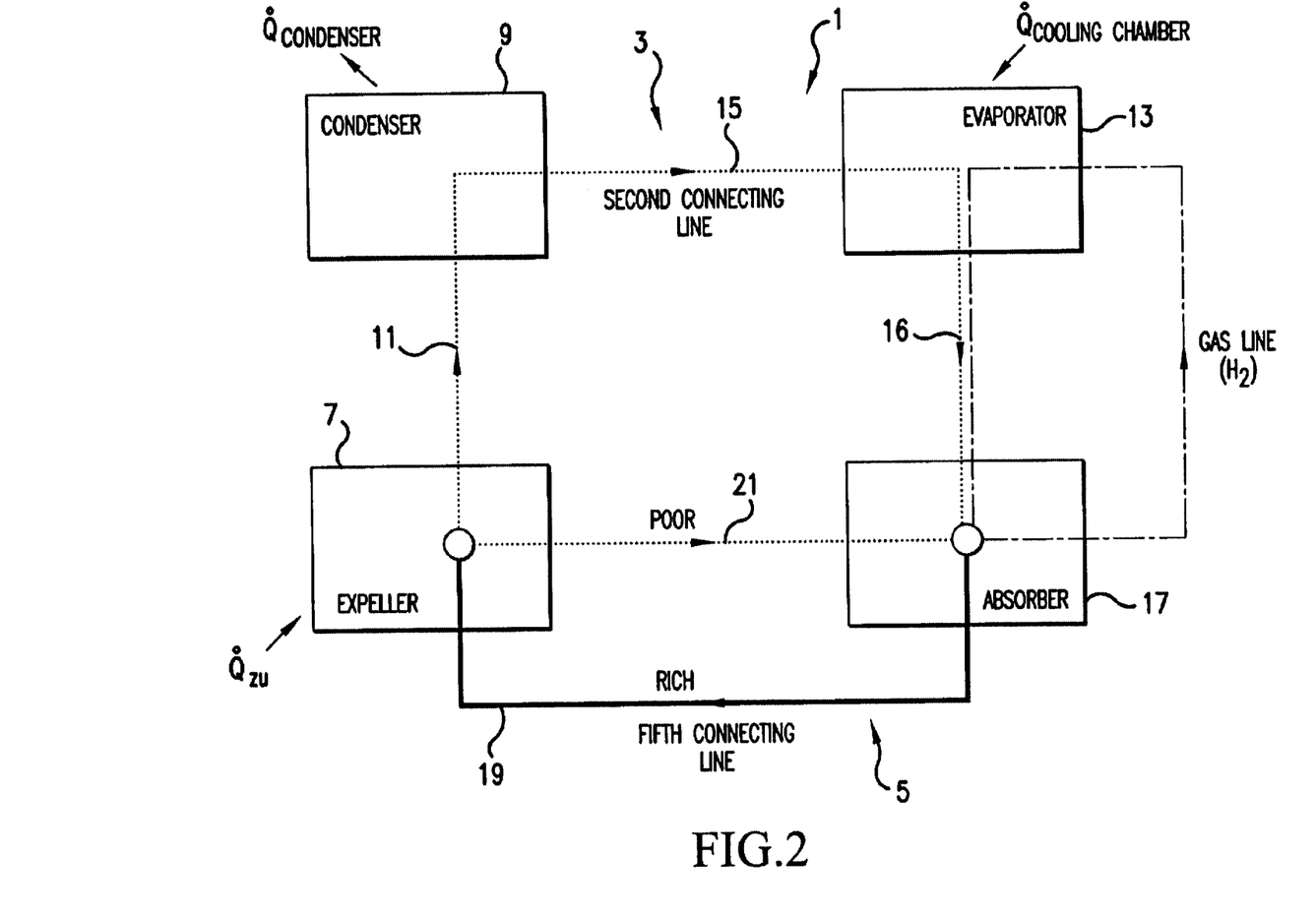
FIG. 2 is a schematic view of the essential functional tasks of the individual components of the absorption cooling device shown in FIG. 1.
Figure 3:
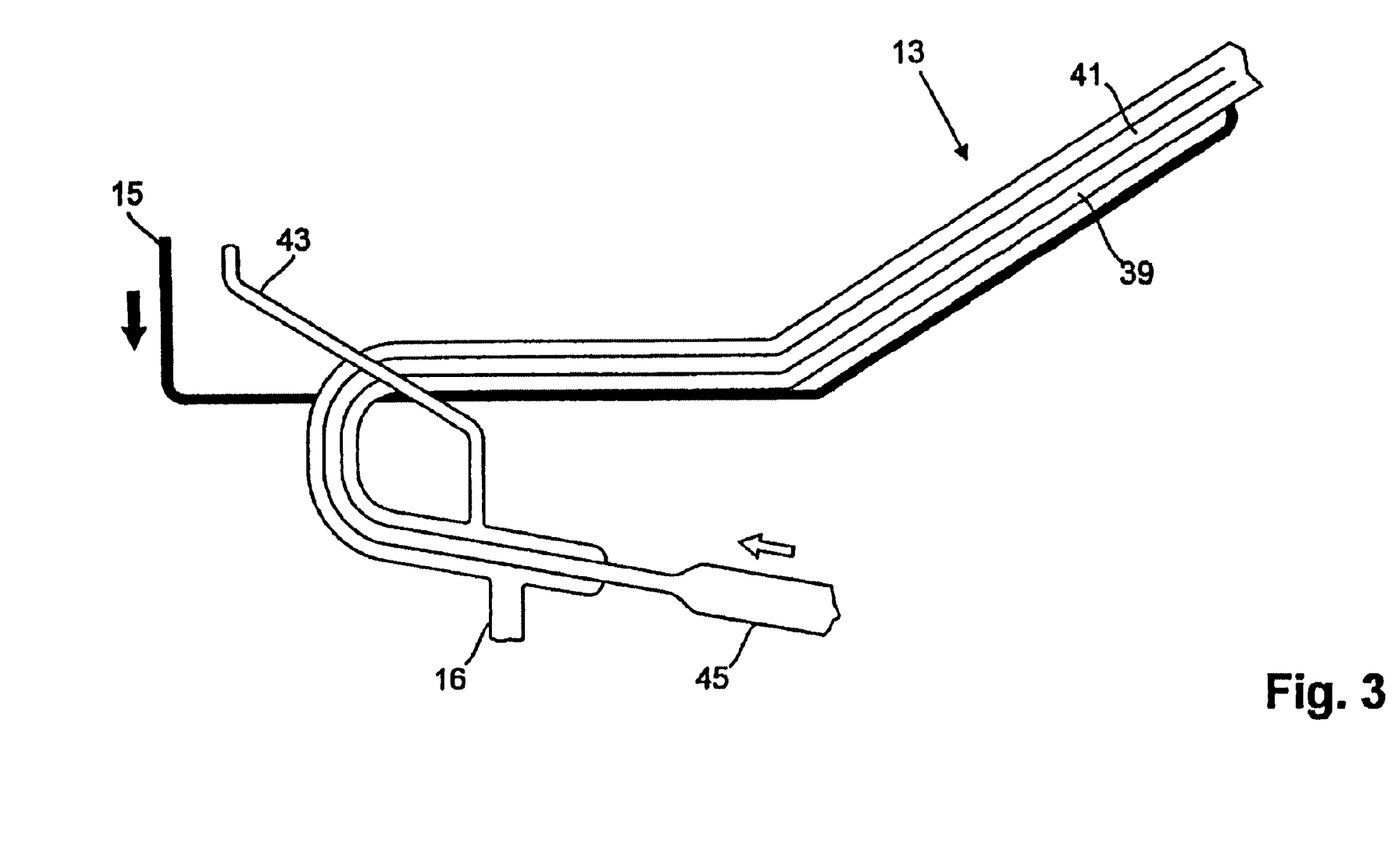
FIG. 3 is a detailed view of the absorption cooling device shown in FIG. 1 for explanation of an assistant gas circuit thereof.
Figure 4:
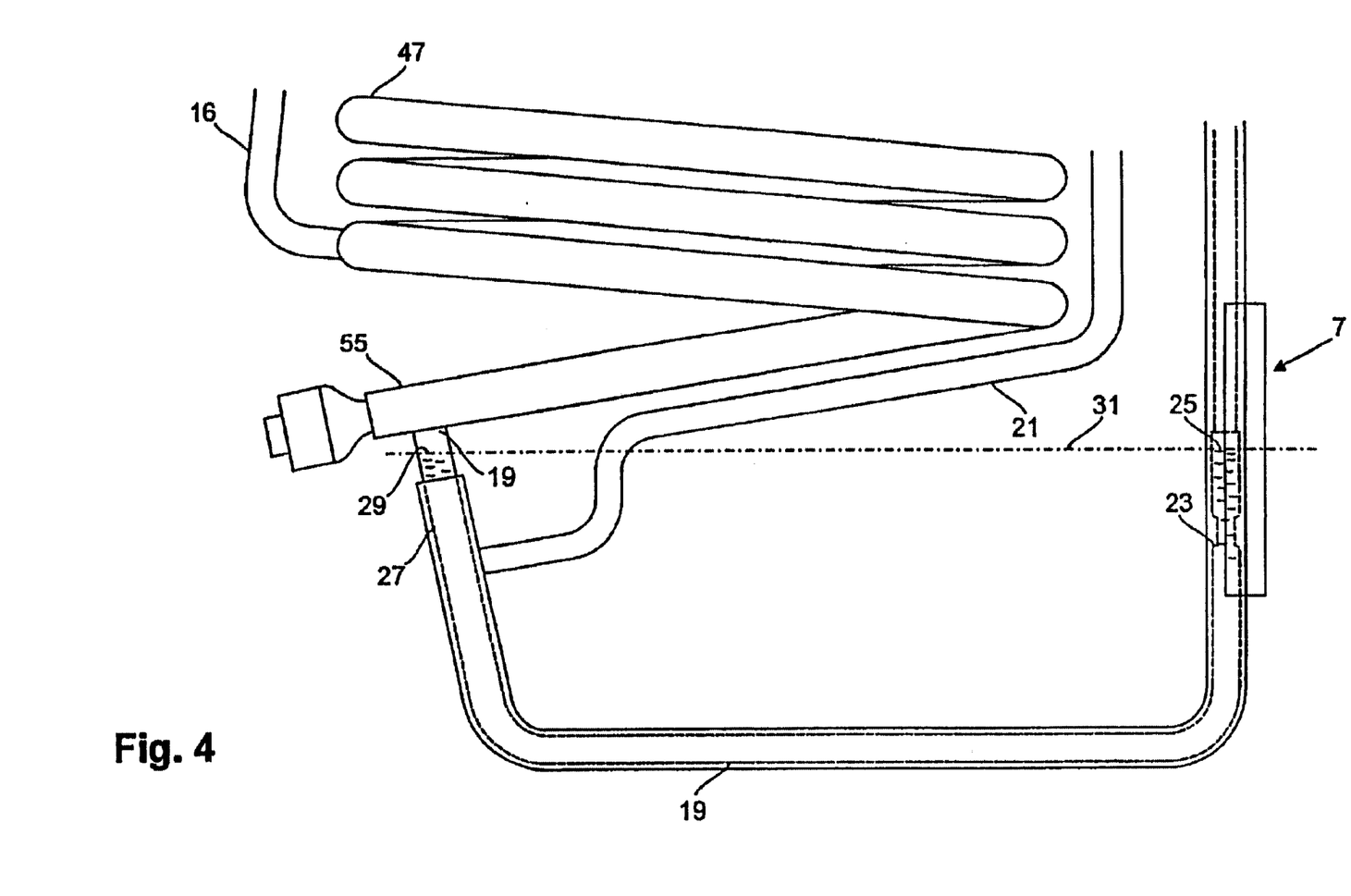
FIG. 4 is an enlarged view of FIG. 1 for explanation of forming liquid levels.

As can better be seen from FIG. 3, said evaporator 13 is embodied as serpentine pipe evaporator, said connecting line 15 feeding said liquid working agent on an increased level into an annular pipe 39. Furtheron, also on an increased level through a central pipe 41 arranged concentrically within said annular pipe 39 hydrogen is supplied as assistant gas. Said liquid working agent trickles down on the wall of said obliquely arranged annular pipe 39 and therein dissolves in said assistant gas with absorption of heat. The mixture of assistant gas and working agent is withdrawn from said annular pipe 39 through said connecting line 16 and supplied to said absorber 17. It can further seen from FIG. 3 that in the area of ending of said connecting pipe 16 also an overflow pipe 43 which with its other end is connected to said condenser 9 for removing excessive assistant gas from there, ends into said annular pipe 39. Said assistant gas introduced into said central pipe 41 originates from said absorber 17 and is supplied by the latter to said evaporator 13 through a further connecting line 45.

Said absorber 17 includes a counterflow exchange path formed by a pipe 47 extending obliquely to horizon, which is wound in helical-like manner with formation of several pipe turns 49. The connecting line 21 for supplying said solvent enriched in working agent to a level 51 ends in said counterflow heat exchanger 47 and said connecting line 16 for supplying evaporated working agent ends in said counterflow heat exchanger on a level 53 being lower with respect to level 51. In said counterflow heat exchanger 47 then said solvent moves downwardly in counterflow to the ascending gaseous working agent, said working agent enriching in said solvent tickling downwardly.

Said pipe 47 of said counterflow heat exchanger extends over the area in which it acts as counterflow heat exchanger, i.e. in the area between said ending of said connecting line 16 and said ending of said connecting line 21, in one piece in an extension 55. Herein, said extension also continues to extend obliquely to horizontal so that said solvent tickling downwardly in said counterflow heat exchanger 47 also tickles down into said extension 55. In the area of its lower end said extension 55 on a connecting point 57 is directly connected to the end opposite to said expeller 7, of said connecting line 19.

Said solvent enriched with working agent thus after having passed said counterflow exchange path 47 continues to tickle into said extension 55 and finally drips on the liquid level 29 arranged within the end 27 of said connecting line 19.

Since said liquid level 29 is encircled by said end area of connecting line 19, said liquid level 29 has a total surface essentially corresponding to the medium cross-section of said connecting line 19. Said comparatively small total surface of said liquid level 29 makes sure that the concentration of said working agent in said solvent directly below said liquid level 29 very quickly adapts to the concentration of said working agent in said solvent as exiting said absorber 17. By this quick adaptation of said working agent concentrations in said solvent in the area of said liquid level 29 said concentration also very quickly is transmitted to the solvent supplied to said expeller through said connecting line 19 so that a stationary operation of said cooling device is reached quite quickly.

In the following modifications of the absorption cooling device shown in FIGS. 1 to 4 are explained. Components corresponding to one another with respect to their construction and their function are referred to with the reference numbers of FIGS. 1 to 4, however, for distinction are provided with a character. For elucidation reference is made to the entire previous description.

Figure 5:
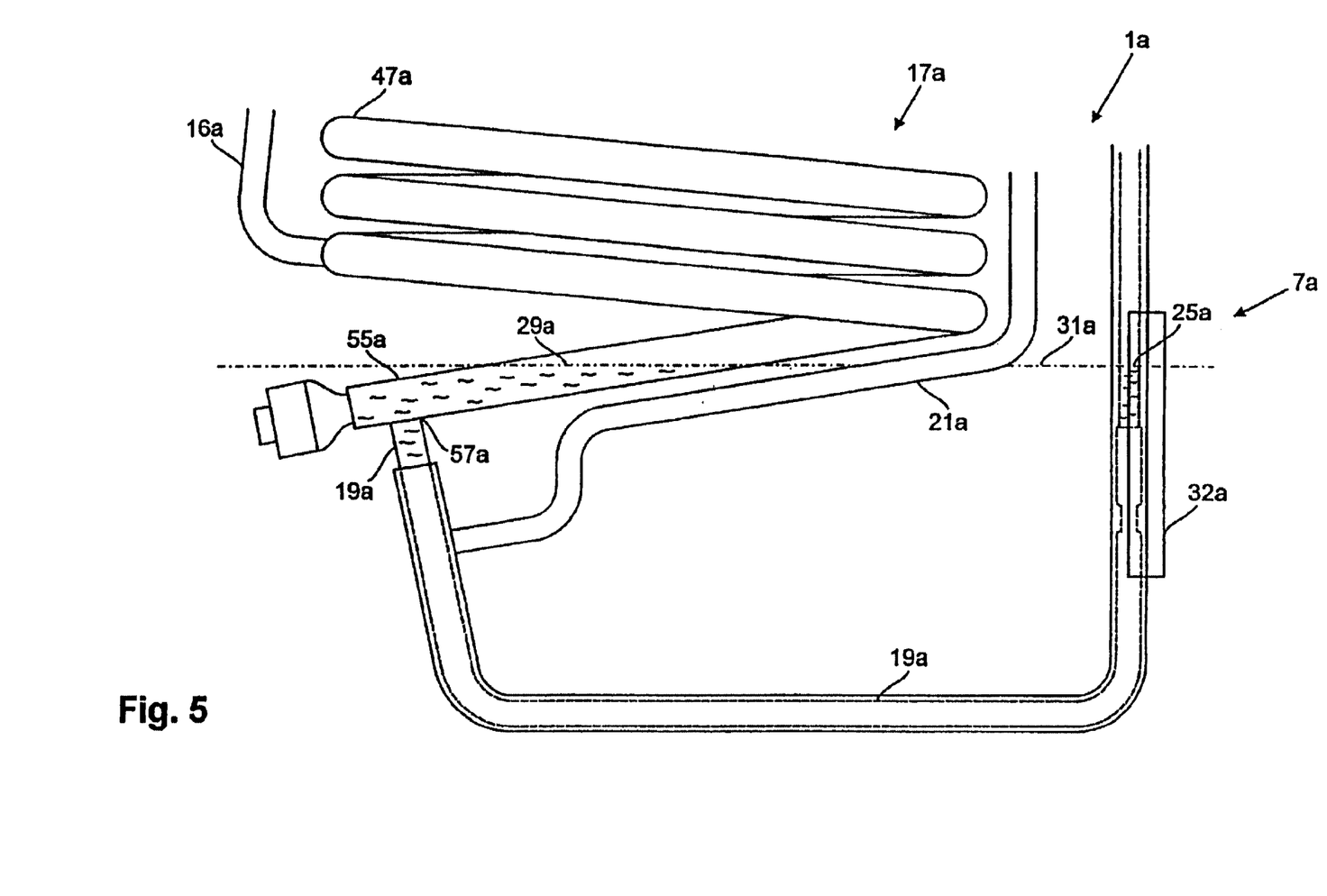
FIG. 5 is a view corresponding to FIG. 4, of a further embodiment of the invention with an amended liquid level

An absorption cooling device 1a shown in FIG. 5 differs from the absorption cooling device shown in FIGS. 1 to 4 only in that a level 31a of a liquid level 25a formed in the area of an expeller 7a in a connecting line 19a between an absorber 17a and said expeller 7a is on a higher level 31a such that a liquid level 29a communicating with said liquid level 25a through a connecting line 19a is not formed, like in the embodiment of FIGS. 1 to 4, in the end area opposite to said expeller 7a, of said connecting line 19a but in the area of an extension 55a of a pipe 47a extending obliquely to horizon, forming a counterflow exchange path, of said absorber 17a. Thereby said liquid level 29a in case of circular cross-section of said pipe extension 55a takes an oval surface shape, wherein, however, the entire surface of said liquid level 29a is not essentially larger than the cross-section of said connecting line 19a. In particular, the surface of said liquid level 29a is smaller than ten times the medium cross-section of said connecting line 19a.

Figure 6:
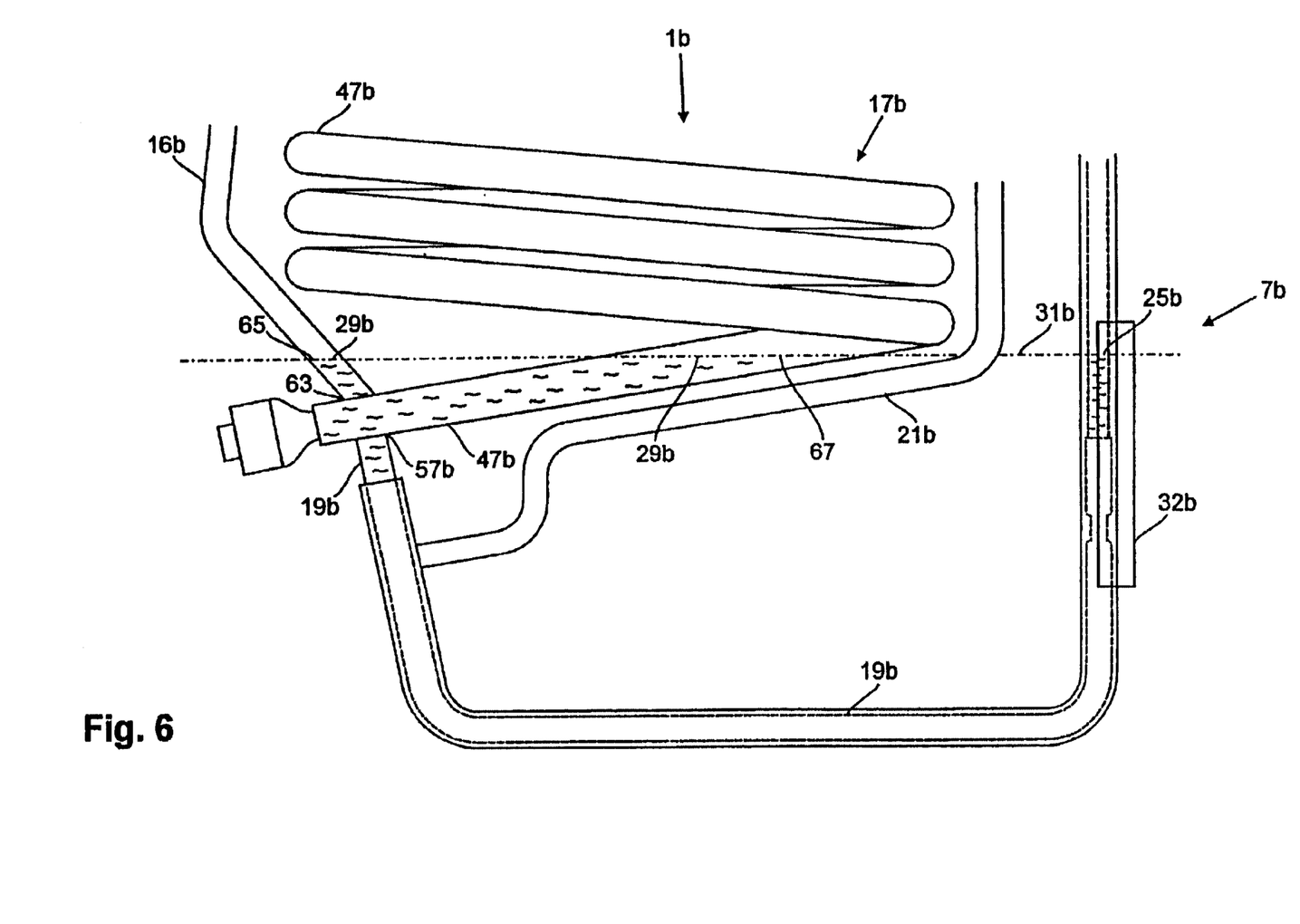
FIG. 6 is a view similar to FIG. 4, of a further modified embodiment of the invention.

An absorption cooling device 1b shown in FIG. 6 with respect to its construction is mostly similar to the cooling devices shown in FIGS. 1 to 5. However, in said absorption cooling device 1b shown in FIG. 6 a connecting line 16b for transferring said evaporated working agent from an evaporator to an absorber 17b ends in a pipe 47b forming a counterflow exchange path in a position 63 arranged directly adjacent to a position 57b where a connecting line 19b between absorber 17b and an expeller 7b ends in said pipe 47b, Said connecting line 16b as well as said connecting line 17b thus directly end in said pipe 47 forming said counterflow exchange path.

Herein, a liquid level 29b corresponding with a liquid level 25b formed in said expeller 7b, through said connecting line 19b and together with it being arranged on an essentially common level 31b, is located higher than said connecting point 63 of said connecting line 16b into said counterflow exchange path 47b. Thereby, said liquid level 29b includes two partial surfaces, namely a partial surface 65 arranged within said connecting line 16b and a partial surface 67 arranged within said obliquely extending pipe 47b.

Also in this embodiment the total surface of said liquid level 29b composed of said two partial surfaces 65 and 67 is comparatively small and in particular is smaller than e.g. ten times a medium pipe cross-section of said connecting line 19b.

Herein, said liquid level 31b explained in connection with the description of FIG. 6 is shown for a starting condition of said cooling device. In course of the starting phase of said cooling device said level 31b of said liquid level 29b will drop so that the ending of said connecting line 16b into said counterflow exchange path 47b is located above said liquid level 29b and said gaseous working agent supplied to said absorber 17b through said connecting line 16b can in uninhibited manner enter said counterflow exchange path 47b and then rise therein.

In the preceding, the magnitudes or said liquid level corresponding to the liquid level in said expeller respectively were correlated to the cross-section of said connecting lines between absorber and expeller. However, it also is possible to also relate the magnitudes of said liquid levels to the cross-section of said connecting line for supplying solvent enriched with working agent from said expeller to said absorber. Herein, then a characteristic medium cross-section of said connecting lies in the area of said liquid heat exchanger or in an area located outside of said liquid heat exchanger has to be formed. It is further conceivable to relate the magnitude of said liquid level to the cross-section of a further connecting line of said cooling device. In particular, it also is conceivable to relate the magnitude of said liquid level to the cross-section of said pipe forming said counterflow exchange path, wherein there, too, said liquid level then is made small as compared to said pipe cross-section, namely in particular smaller than five times, in particular smaller than three times, in particular smaller than the cross section of said pipe and further in particular smaller than half of the cross-section of said pipe.

What is claimed is:

1. Absorption cooling device including
    an expeller (7) for expelling a working agent in gaseous form from enriched solvent for depleting said working agent in a solvent circuit (5),
    a first connecting line (11) for transferring said expelled working agent from said expeller (7) to a condenser (9) for condensation of said expelled working agent,
    a second connecting line (15) for transferring said condensed working agent from said condenser (9) to an evaporator (13) for evaporating said condensated working agent with absorption of heat from a space to be cooled, a third connecting line (16) for transferring said evaporated working agent from said evaporator (13) to an absorber unit (17), fourth connecting line (21, 35) for transferring said solvent depleted with working medium from said expeller (7) to said absorber unit (17), said absorber unit (17) comprising a counterflow exchange path (47) extending over a given high difference (51, 53), into which said third connecting line (16) ends on a low level (53) and into which said fourth connecting line (21, 35) ends on a higher level (51) so that in said absorber unit (17) said working agent in said solvent enriches;

a fifth connecting line (19) for transferring said solvent enriched with working agent from said absorber (17) to said expeller (7), wherein at least a part of said fifth connecting line (19) is filled with a liquid portion of said solvent and a first liquid level (25) of said solvent is formed in an area (23) of an end facing said expeller (7), of said fifth connecting line (19) or in said expeller (7) and a second liquid level (29) corresponding with said first liquid level (25) through said fifth connecting line (19) is formed, characterized in that the total surface of said second liquid level (29) is smaller than ten times, in particular smaller than eight times, in particular smaller than five times, in particular smaller than three times and in particular smaller than twice a medium cross-section of said fifth connecting line (19) or said fourth connecting line (21, 35).

2. Absorption cooling device as defined in claim 1 or in the preamble of claim 1, characterized in that said second liquid level (29) is encircled by at least one or several of the components of a group of components which consists of said second connecting line (19), namely in an area of one end (27) thereof facing said absorber (17), said absorber (17) as well as said third connecting line (16), namely in an area of an end thereof facing the ending into said absorber (17).

3. Absorption cooling device as defined in claim 1, wherein said second liquid level (29) is encircled by exactly one, two or three components (19, 17, 16) of said group.

4. Absorption cooling device as defined in claim 1, wherein the entire surface of said second liquid level (29) at least during the stationary operation of said device is encircled by said fifth connecting line (19).

5. Absorption cooling device as defined in claim 1, wherein said surface of said second liquid level (29a; 29b) at least during stationary operation of said device is encircled by said absorber (17a; 17b).

6. Absorption cooling device as defined in claim 5, wherein said counterflow exchange path includes a pipe (47a; 47b) extending obliquely to horizon and said surface of said second liquid level (29a; 29b) is encircled by said pipe of said counterflow exchange path or an extension (55a) thereof.

7. Absorption cooling device as defined in claim 6, wherein said extension (55a) is connected with said pipe of said counterflow exchange path (47) in one piece.

8. Absorption cooling device as defined in claim 1, wherein during a starting phase of the operation of said device said second liquid level (29b) is encircled by said third connecting line (16b).

9. Absorption cooling device as defined in claim 1, wherein said counterflow exchange path includes a pipe (47) extending obliquely to horizon, which starting in a position in which said third connecting line (16) ends in said absorber (17) extends in two opposing directions.

10. Absorption cooling device as defined in claim 9, wherein said fifth connecting line (19; 19b) directly ends in said pipe (47b) of said counterflow exchange path or an extension (55) thereof.

11. Absorption cooling device as defined in claim 1, wherein a sixth connecting line (45) extending out of said absorber on a high level, for transferring an assistant gas from said absorber (17) to said evaporator (13) is provided for, wherein said working agent in said assistant gas enriches in said evaporator (13).

12. Absorption cooling device as defined in claim 1, wherein said fourth connecting line (21) and said fifth connecting line (19) in areas extend one beside the other with heat exchange for forming a liquid heat exchanger.

13. Absorption cooling device as defined in claim 1, characterized in that said absorption surface of said absorption cooling device approximately corresponds to the absorption surface of a device with a reservoir in that with constant total surface said absorption surface of said reservoir by enlargement of the absorption surface of said counterflow exchange path (47) of said absorber unit (17) is integrated into it.

14. Absorption cooling device as defined in claim 13, characterized in that said absorption surface of said reservoir by elongation of said counterflow exchange path (47) of said absorber unit (17) is integrated in it.

15. Absorption cooling device as defined in claim 13, characterized in that said absorption surface of said reservoir by an enlargement of cross-section of said pipeline of said counterflow exchange path (47) of said absorber unit (17) is integrated in it.

16. Absorption cooling device as defined in claim 13, characterized in that said absorption surface of said reservoir by surface enlargement of said inside wall of said pipeline of said counterflow exchange path (47) of said absorber unit (17) is integrated in it by means of grooves located in said wall.

17. Absorption cooling device as defined in claim 16, characterized in that said grooves extend into different directions and cross respectively.

* * * * *